W. R. KLECKNER.
DEVICE FOR APPLYING SUBSTANCES TO TREES, SHRUBS, AND VINES.
APPLICATION FILED JAN. 24, 1913.
1,080,460.   Patented Dec. 2, 1913.
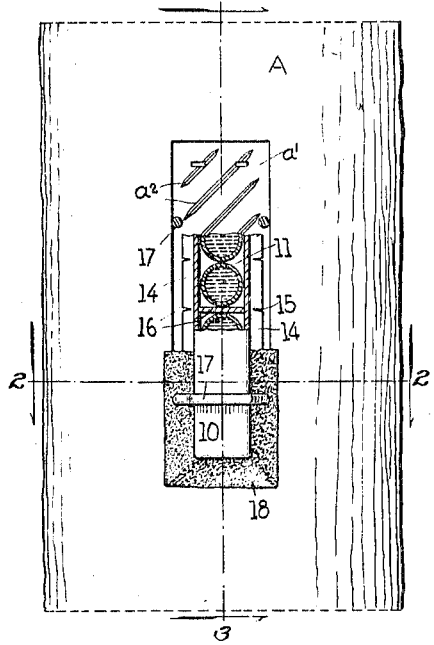
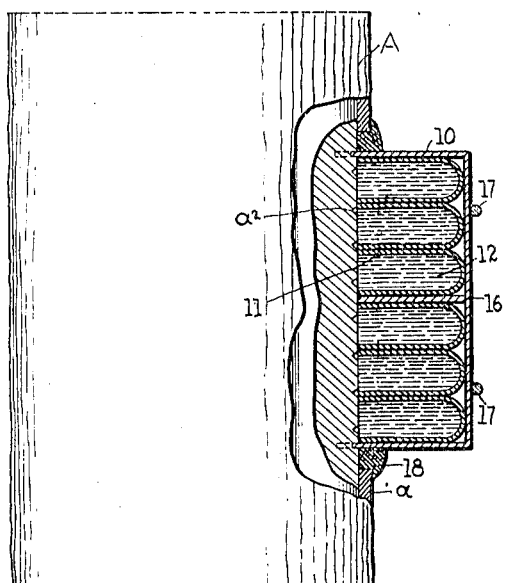
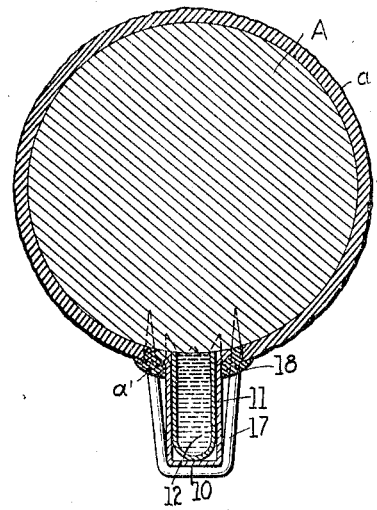
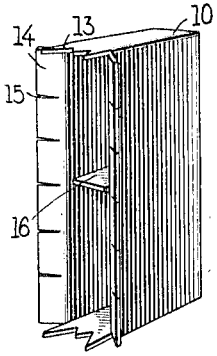
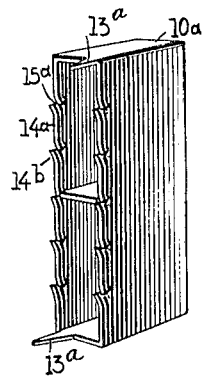
WITNESSES
INVENTOR
William R. Kleckner,
BY
ATTORNEYS

UNITED STATES PATENT OFFICE.

WILLIAM RENATUS KLECKNER, OF COWELL, CALIFORNIA.

DEVICE FOR APPLYING SUBSTANCES TO TREES, SHRUBS, AND VINES.

1,080,460.     Specification of Letters Patent.     Patented Dec. 2, 1913.

Application filed January 24, 1913. Serial No. 743,899.

*To all whom it may concern:*

Be it known that I, WILLIAM R. KLECKNER, a citizen of the United States, and a resident of Cowell, in the county of Contra Costa and State of California, have invented a new and Improved Device for Applying Substances to Trees, Shrubs, and Vines, of which the following is a full, clear, and exact description.

My invention relates to a means whereby an insecticide or other substance may be so applied to a tree, shrub or vine, as to enable the sap to readily take up such substance.

It is a design of my invention to provide a device for the indicated purpose which may be secured to a tree, shrub or vine without injury to the same.

It is a further design of the invention to provide means whereby to conveniently and firmly secure the device in position.

It is also a design of the invention to provide a device for the indicated purpose which will prevent leakage and waste of the substance to be applied to the tree, shrub or vine.

The invention furthermore has for its purpose to provide an improved method of applying the substance to a tree.

The invention will be more particularly explained in the specific description to be given.

Reference is to be had to the accompanying drawings forming a part of this specification, in which similar characters of reference indicate corresponding parts in all the views.

Figure 1 is a face view with parts broken out, showing my device applied to a portion of a tree; Fig. 2 is a cross section on the line 2—2 of Fig. 1; Fig. 3 is a sectional side elevation, the section being indicated by the line 3—3 of Fig. 1; Fig. 4 is a perspective view of the cap for holding the substance; and Fig. 5 is a perspective view showing a slightly different form of the cap.

In carrying out my invention use is made of a container in the form of a cap 10, which preferably is rectangular and of greater height than width, and of sufficient depth to hold capsules 11 formed of gelatin or other approved material adapted to contain any solution 12, that it is desired to apply to the tree, indicated by the letter A, to be taken up by the sap. At the open front side of the cap 10 there are provided, preferably near each end, spurs 13 which project forwardly to a sufficient extent to penetrate into the tree. Along the side edges there extend vertical flanges 14, preferably bent slightly outward at an angle to lie within the ends of the spurs, the flanges being slitted at intervals as at 15, in order that the flanges may accommodate themselves to the contour of the tree. If desired, also, a partition 16 may be formed in the cap, to separate more or less of the capsules 11 from others, to sustain more or less of the weight of the upper capsules that they may not distort and interfere with the normal action of those below. The spurs 13 are designed to be temporary holding-devices, while staples 17 are employed to secure the cap 10 firmly in position.

In practice, the bark $a$ of the tree, shrub or vine is removed as at $a'$, to expose the sap wood over an area somewhat greater than that of the cap 10, and slight incisions $a^2$ are made in the sap wood of the exposed portion, to produce a flow of sap. The capsules 11 containing the substance to be introduced are then opened by cutting off or otherwise removing one end of the capsule, according to its form and material. The capsules are then inserted in the cap 10, with the open end outermost, thus presenting the open ends at the open side of the cap, and the size of the capsules relatively to the cap will preferably be such that the open ends of the capsules will contact with the sap wood when the cap is in place. The cap containing the capsules is then placed against the exposed sap wood, and the spurs 13 forced into the wood to temporarily sustain the cap in place, after which the staples 17 are caused to embrace the cap and the points driven into the wood. There will now be a margin of exposed sap wood outside of the flanges 14. Finally, any plastic material or paste 18 is applied to the exposed margin of the sap wood, to overlap the cut edges of the bark $a$ and form a tight closure and seal around the edge of the cap, between the same and the bark. Any proper sticky paste or cement material may be employed which is waterproof. This material will hermetically seal the cut edges of the bark and the open end of the cap. The preferred paste is of a character to set when dry, and the incisions 15 in the flanges 14, in addition to causing the flanges to conform to the contour of the sap wood, serve also to effect an interlocking engagement with the sealing material to afford additional means for sustaining the device in position.

In the application of the device to the tree the closed ends of the capsule will be pressed into firm contact with the sap wood, and as the sap oozes from the incisions $a^2$, the material from the capsules will finally mingle with the sap, and as there is no escape for the fluid material it will be taken up into the tree and be absorbed.

In Fig. 5 a single spur $13^a$ is formed on the cap $10^a$, at each end, instead of a plurality of spurs as in the form shown in Fig. 4. Also the flanged sections $14^a$, formed by producing the cuts $15^a$ may be slightly bent as at $14^b$, instead of being plain as shown in Fig. 4.

Having thus described my invention, I claim as new and desire to secure by Letters Patent:

1. The herein-described device for applying a substance to trees, shrubs and vines, comprising a cap having an open side adapted to be presented to the tree or the like, and having projecting members to temporarily retain the device in position, additional fastening means to secure the cap in place, the caps at the open side having longitudinal edge flanges formed with incisions, and capsules constituting containers for the substance to be applied, the capsules being open at a portion thereof and presenting open ends at the open side of the cap to contact with the surface of the tree or the like.

2. The herein-described device for the application of a substance to a tree or the like, consisting of a receptacle adapted to contain a capsule, and having projecting members at the open end thereof for entering into the tree or the like, and with longitudinal flanges at the said open end to contact with the tree.

3. The herein-described device for the application of a substance to a tree or the like, consisting of a receptacle adapted to contain a capsule, the container being open at one side to present the capsules to the tree or the like, and having flanges along edges thereof at the open side to contact with the surface of the tree or the like.

4. The herein-described device for use in applying a substance to a tree, shrub or vine, to be taken up by the sap, and comprising a container adapted to contain the material to be applied and having separate flange members at the open side of the cap, along the edges.

5. The herein-described device for use in applying a substance to a tree, shrub or vine, to be taken up by the sap, and comprising a receptacle adapted to hold the material to be applied, and having an open side formed with laterally bent flanges at the edges of the cap, at the open side thereof.

6. The herein-described device for use in applying a substance to a tree, shrub or vine, to be taken up by the sap, and comprising a receptacle adapted to hold the material to be applied, and having an open side formed with laterally bent flanges at the edges of the cap, at the open side thereof, the cap furthermore having spurs at the open side projecting beyond said flanges.

7. The herein-described device for applying a substance to a tree, shrub or vine, comprising a container adapted to hold the substance to be applied, and formed with an open side for outflow of the contained substance and for the reception of sap, and means to secure the container to the tree, shrub or vine, the container having a formation at the open side to contact with the surface against which it is to be affixed.

In testimony whereof I have signed my name to this specification in the presence of two subscribing witnesses.

WILLIAM RENATUS KLECKNER.

Witnesses:
   CLYDE R. LEFKER,
   D. O. ORR.